US 9,956,963 B2

(12) United States Patent
Vijaya Kumar et al.

(10) Patent No.: US 9,956,963 B2
(45) Date of Patent: May 1, 2018

(54) APPARATUS FOR ASSESSING, PREDICTING, AND RESPONDING TO DRIVER FATIGUE AND DROWSINESS LEVELS

(71) Applicant: GM Global Technology Operations LLC, Detroit, MI (US)

(72) Inventors: Vivek Vijaya Kumar, Shelby Township, MI (US); Donald K. Grimm, Utica, MI (US); Raymond J. Kiefer, Huntington Woods, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days. days.

(21) Appl. No.: 15/176,878

(22) Filed: Jun. 8, 2016

(65) Prior Publication Data
US 2017/0355377 A1 Dec. 14, 2017

(51) Int. Cl.
*G08B 23/00* (2006.01)
*B60W 40/08* (2012.01)

(52) U.S. Cl.
CPC ..... *B60W 40/08* (2013.01); *B60W 2040/0872* (2013.01)

(58) Field of Classification Search
CPC ...... G06K 9/00845; A61B 5/18; G08B 21/06; B60K 28/02; B60K 28/06; B60K 28/066; B60W 40/08
USPC ........................................ 340/575, 576, 439
See application file for complete search history.

(56) References Cited

U.S. PATENT DOCUMENTS 9,198,575 B1* 12/2015 Blacutt .............. G06K 9/00845
2008/0174451 A1* 7/2008 Harrington ............ G08B 21/06
340/905
2011/0304465 A1* 12/2011 Boult ..................... B60K 28/06
340/576

(Continued)

OTHER PUBLICATIONS

Arun Sahayadhas et al., "Detecting Driver Drowsiness Based on Sensors: A Review", Sensors, Published online Dec. 7, 2012, http://www.ncbi.nlm.nih.gov/pmc/articles/PMC3571819/.

(Continued)

*Primary Examiner* — Thomas Mullen
(74) *Attorney, Agent, or Firm* — Cynthia R. Parks; Parks IP Law LLC

(57) ABSTRACT

A system for analyzing driver fitness to drive with consideration given to any of various conditions such as driver drowsiness, fatigue, and anxiety. The system includes a processing hardware unit, and a non-transitory computer-readable storage device comprising various modules to determine if the driver is impaired. The modules include an input interface module that, when executed by the processing unit, receives sensor data indicating a present driver health factor. A database module includes pre-established driver-profile data particular to a driver. And the modules include an activity module that, when executed by the processing unit, obtains the driver-profile data and the sensor data, and determines, based on the present health factor and the pre-established driver-profile data, fitness of the driver to drive. The disclosure relates in various embodiments to a computer-readable storage device, separately, and processes performed by the system and device.

19 Claims, 5 Drawing Sheets

(56) References Cited

U.S. PATENT DOCUMENTS

| | | | | |
|---|---|---|---|---|
| 2012/0158283 | A1* | 6/2012 | Arastafar | G01C 21/3641 701/410 |
| 2015/0164416 | A1* | 6/2015 | Nothacker | G08B 21/02 340/573.1 |
| 2016/0023662 | A1* | 1/2016 | Wulf | B60W 40/08 340/576 |
| 2016/0046298 | A1* | 2/2016 | DeRuyck | G06K 9/00845 340/576 |
| 2016/0052391 | A1* | 2/2016 | Walsh | G08B 21/06 340/575 |
| 2016/0090097 | A1* | 3/2016 | Grube | G08B 21/06 340/576 |
| 2016/0287158 | A1* | 10/2016 | Lawrenson | G08B 21/06 |

OTHER PUBLICATIONS

P. Philip et al., "Simple Reaction Time, Duration of Driving and Sleep Deprivation in Young Versus Old Automobile Drivers", J. Sleep Res., 1999, pp. 9-14, vol. 8.

Drew Dawson et al., "Fatigue, Alcohol and Performance Impairment", Scientific Correspondence, Nature Macmillan Publishers Ltd 1997, pp. 235-237, vol. 388.

Stephen Fairclough et al., "Impairment of Driving Performance Caused by Sleep Deprivation or Alcohol: A Comparative Study", Human Factors: The Journal of the Human Factors and Ergonomics Society 1999, vol. 41, pp. 118.

A M Williamson et al., "Moderate Sleep Deprivation Produces Impairments in Cognitive and Motor Performance Equivalent to Legally Prescribed Levels of Alcohol Intoxication", Occup Environ Med 2000, vol. 57, pp. 649-655.

Jeffrey S. Durmer, M.D., Ph.D., et al., "Neurocognitive Consequences of Sleep Deprivation", Seminars in Neurology 2005, vol. 25, No. 1, pp. 117-129.

Adrian H. Taylor et al., "Stress, Fatigue, Health, and Risk of Road Traffic Accidents Among Professional Drivers: The Contribution of Physical Inactivity", Annual Review of Public Health, Apr. 2006, vol. 27, pp. 371-391.

Apoorvagiri L.D. et al., "Mental Stress and Its Implications on Reaction Time", International Journal of Computer Trends and Technology (IJCTT), vol. 4, Issue 5, May 2013, https://www.researchgate.net/publication/236984422_Mental_Stress_and_its_Implications_on_Reaction_Time.

* cited by examiner

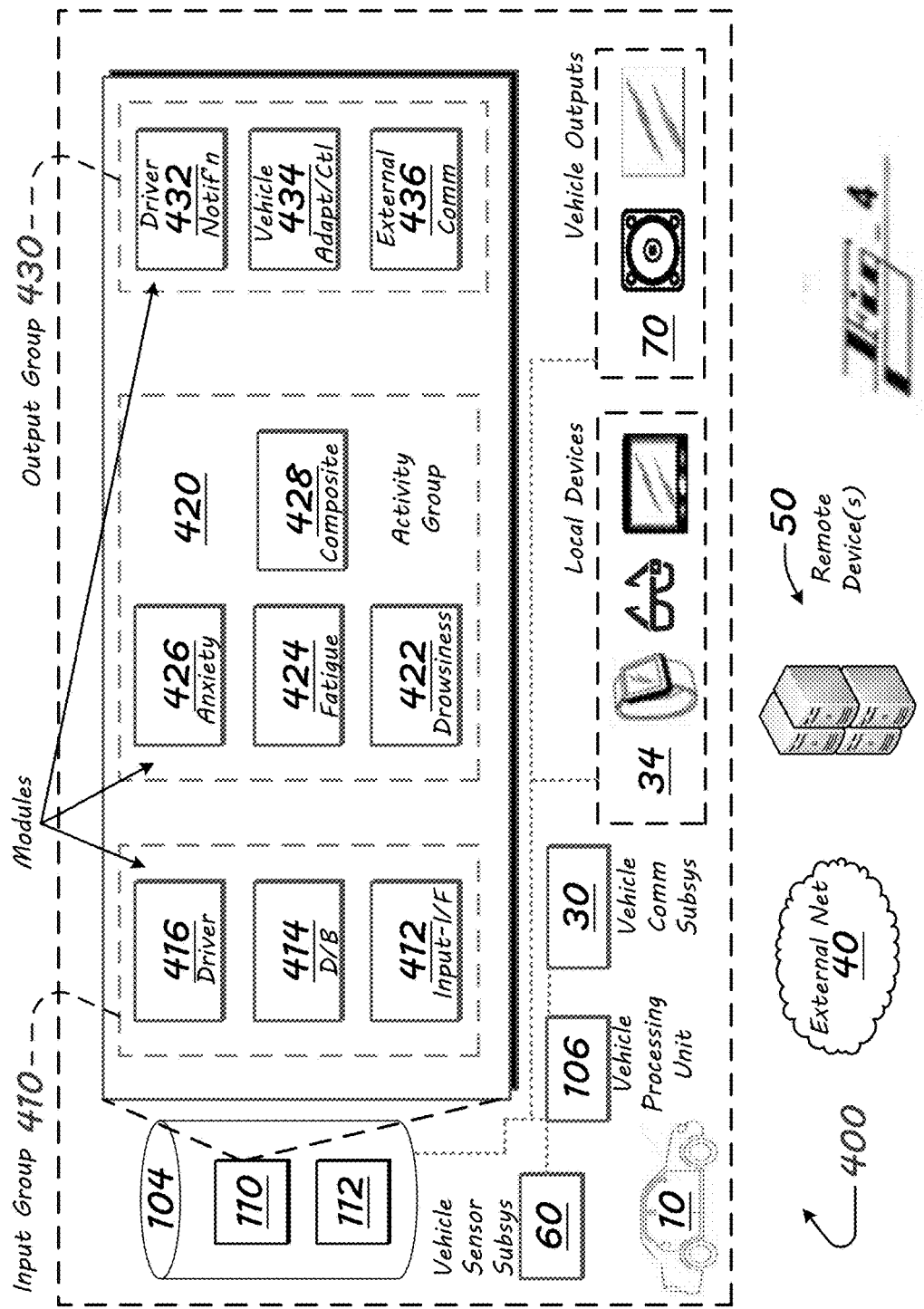

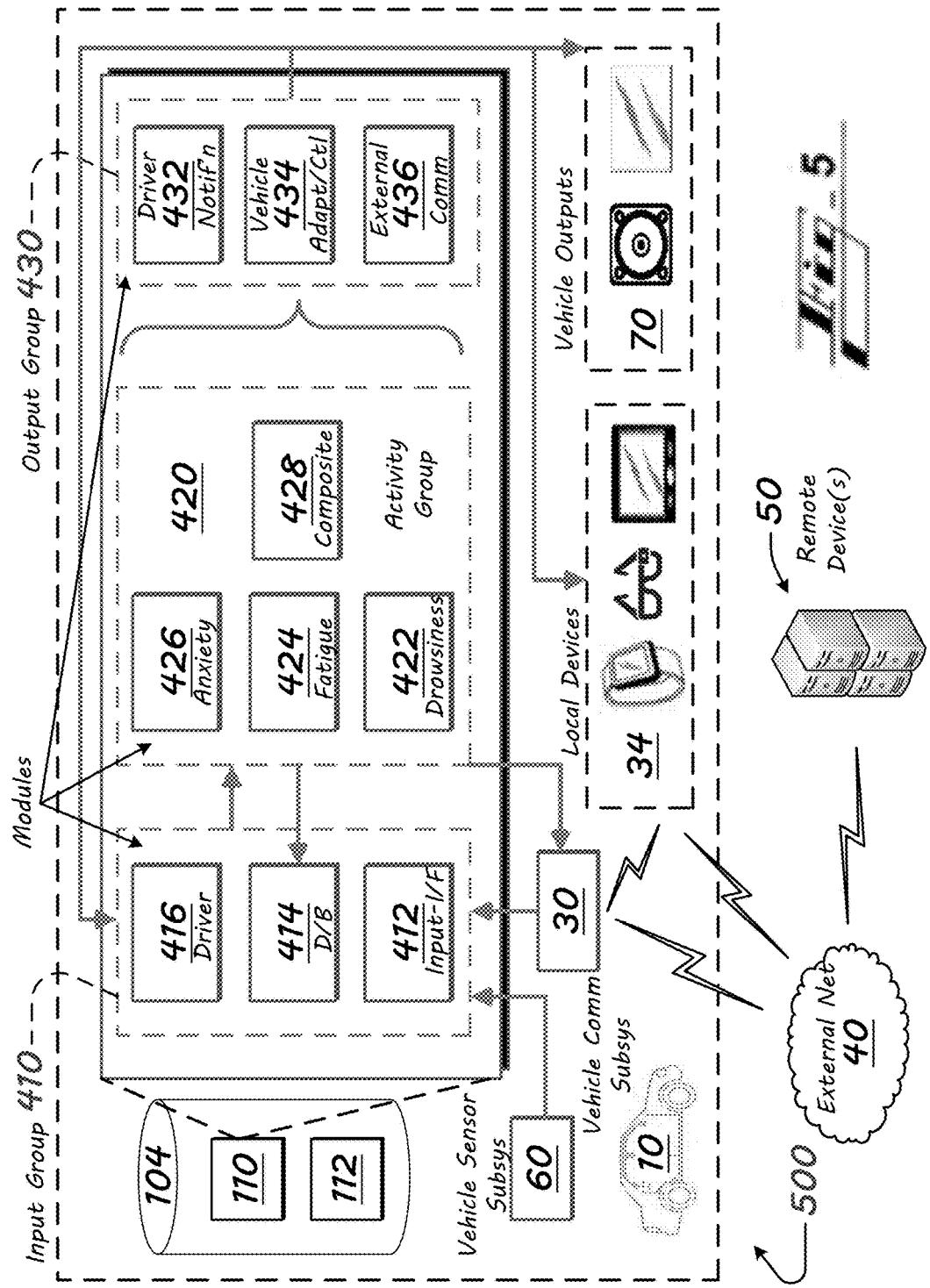

APPARATUS FOR ASSESSING, PREDICTING, AND RESPONDING TO DRIVER FATIGUE AND DROWSINESS LEVELS

TECHNICAL FIELD

The present disclosure relates generally to apparatus for determining fatigue or drowsiness levels of a driver and, more particularly, to methods and apparatus for determining the levels and implementing any of a variety of actions based on the determination. Levels are in various embodiments determined based on output of any of a variety of apparatuses, e.g., any of driver wearable device, such as a smart watch, a non-contact device, like a smart bed in which the person sleeps, and vehicle sensors.

BACKGROUND

This section provides background information related to the present disclosure which is not necessarily prior art.

Driver reaction time can be reduced by drowsiness. Drowsiness, or sleepiness, results typically from lack of sufficient sleep.

Even when drivers are not sleep deprived, fatigue can lower reaction time.

Robust systems are needed to help drivers avoid driving when they are impaired in such ways.

SUMMARY

In one aspect, the present technology relates to a system for analyzing driver fitness to drive with consideration given to any of various conditions such as driver drowsiness, fatigue, and anxiety. The system includes a processing hardware unit, and a non-transitory computer-readable storage device comprising various modules to determine if the driver is impaired. The modules include an input interface module that, when executed by the processing unit, receives sensor data indicating a present driver health factor. A database module includes pre-established driver-profile data particular to a driver. And the modules include an activity module that, when executed by the processing unit, obtains the driver-profile data and the sensor data, and determines, based on the present health factor and the pre-established driver-profile data, fitness of the driver to drive. The disclosure relates in various embodiments to a computer-readable storage device, separately, and processes performed by the system and device.

Other aspects of the present technology will be in part apparent and in part pointed out hereinafter.

DESCRIPTION OF THE DRAWINGS

FIG. 4 shows another view of the vehicle, emphasizing example code modules, with local and remote computing devices.

FIG. 5 shows interactions between the various components of FIG. 4.

Figure 1:
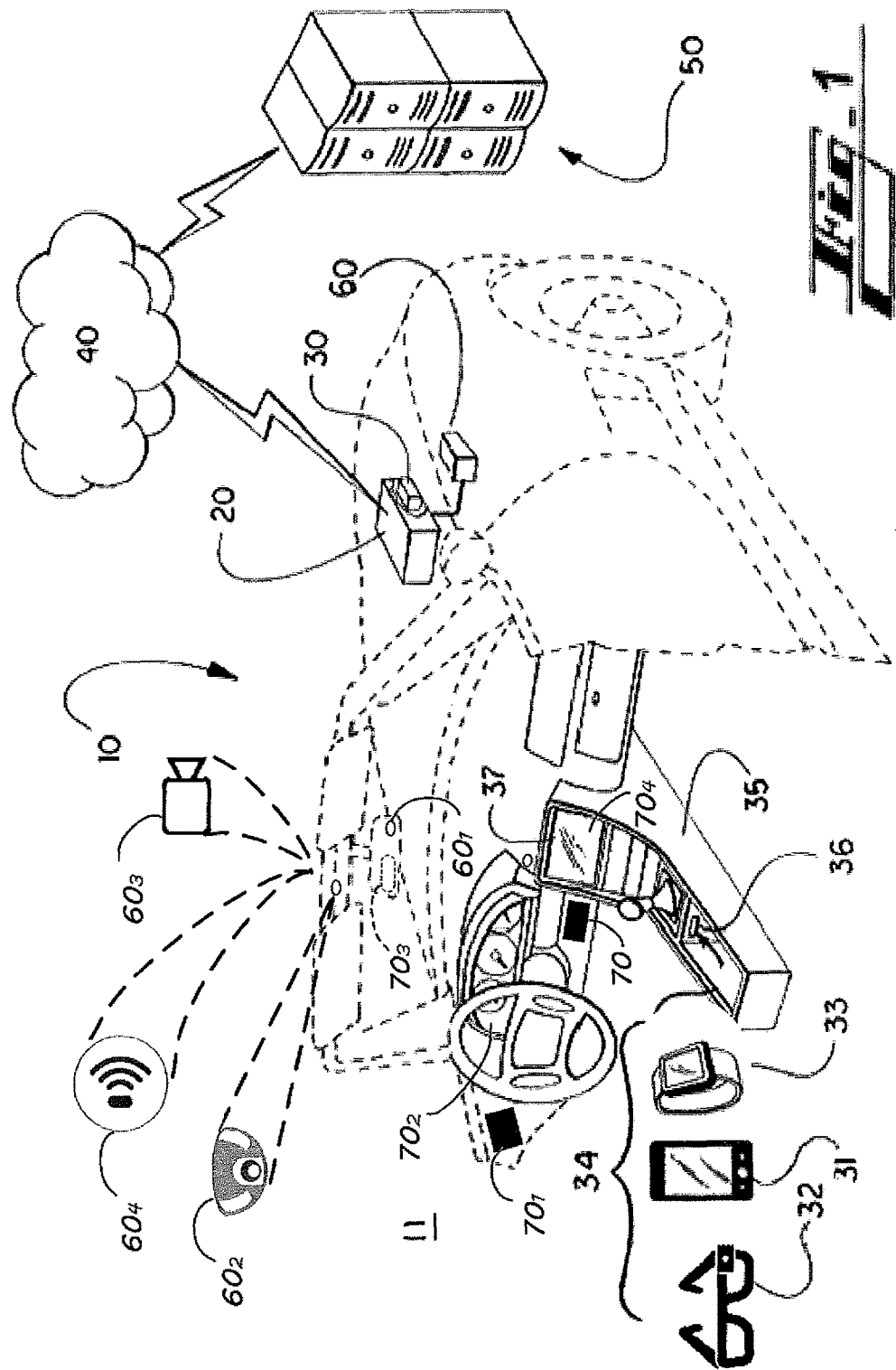
FIG. 1 illustrates schematically an example vehicle of transportation, with local and remote computing devices, according to embodiments of the present technology.

The figures are not necessarily to scale and some features may be exaggerated or minimized, such as to show details of particular components.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. TECHNOLOGY INTRODUCTION

The present disclosure describes, by various embodiments, methods and apparatus for determining whether a driver is drowsy, fatigued, or stressed, and implementing any of a variety of actions based on the determination. Driver state is determined based on output of a driver-wearable device, such as a smart watch, and/or vehicle sensors.

The term impaired, or impairment, is used herein to refer to driver states in which they are not at their best to drive, such as if they are drowsy, or sleepy, fatigued, or stressed or anxious. The term can include other situations as well, such as when the driver is injured, inebriated, or otherwise intoxicated (e.g., intoxicated by drugs).

Example foundational measurements for determining whether the driver is impaired include and are not limited to measurements of a driver's movement activity during sleep, heart rate (HR), electroencephalogram (EEG), voice, gestures, salinity, breath, temperature, electrocardiogram (ECG), Electrodermal Activity (EDA) or Galvanic Skin Response (GSR), Blood Volume Pulse (BVP), Electromyography (EMG), or the like. Each can be evaluated at one or more times—e.g., HR rest, HR exercise, and HR sleep, and HR driving.

The determination can also be based on historic data about the driver, such as from a driver profile maintained at the vehicle, wearable, or remote system.

The determination in various embodiments is determined based on learning functions, including processing data about prior driver activity (states, behavior, such as driving performance with respect to various states, times, etc.) to reach conclusions, such as a prediction of impairment or a present determination of impairment.

Example output actions include and are not limited to: (i) recommending use of autonomous driving, (ii) implementing partial- or fully autonomous driving, (iii) providing a message or otherwise alerting the driver determined to be impaired (e.g., drowsy, fatigued, stressed), (iv) communicating with remote personnel, server, or other computing system about the driver's apparent state, (v) taking action at the remote entity, such as sending the driver a message via a driver mobile device (e.g., smart watch) or the vehicle, (vi) updating a driver profile or account maintained at the remote computing system, vehicle, and/or mobile device, (vii)

adapting collision avoidance alert timing and alert modality, and (viii) adapting automatic braking and/or steering control levels, timing, and control profiles.

While select examples of the present technology describe transportation vehicles or modes of travel, and particularly automobiles, the technology is not limited by the focus. The concepts can be extended to a wide variety of systems and devices, such as other transportation or moving vehicles including aircraft, watercraft, trucks, trains, busses, manufacturing equipment (for example, forklift), construction machines, and agricultural machinery, or of warehouse equipment, the like, and other.

While select examples of the present technology describe autonomous vehicles, the technology is not limited to use in autonomous vehicles (fully or partially autonomous).

II. HOST VEHICLE—FIG. 1

Turning now to the figures and more particularly the first figure, FIG. 1 shows an example host structure or apparatus 10 in the form of a vehicle.

The vehicle 10 includes a hardware-based controller or controller system 20. The hardware-based controller system 20 includes a communications sub-system 30 for communicating with mobile or local computing devices 34 and/or external networks 40.

By the external networks 40, such as the Internet, a local-area, cellular, or satellite network, vehicle-to-vehicle, pedestrian-to-vehicle or other infrastructure communications, etc., the vehicle 10 can reach mobile or local computing devices 34 or remote systems 50, such as remote servers.

Example mobile or local computing devices 34 include a driver smartphone 31, a first example driver-wearable device 32 in the form of smart eye glasses, and a second example driver-wearable device 33 in the form of a smart watch, and are not limited to these examples. Other example wearables 32, 33 include smart apparel, such as a shirt or belt, an accessory such as an arm strap, or smart jewelry, such as earrings, necklaces, and lanyards. Non-wearable remote examples are also contemplated, such as devices placed on, or part of, a bed that measure movement activity while a person is sleeping.

Another example mobile or local device is a driver plug-in device, such as a USB mass storage device, or such a device configured to communicate wirelessly.

Still another example mobile or local device is an on-board device (OBD) (not shown in detail), such as a driver-facing camera, wheel sensor, a brake sensor, an accelerometer, a rotor-wear sensor, throttle-position sensor, steering-angle sensor, revolutions-per-minute (RPM) indicator, brake-force sensors, or other vehicle state or dynamics-related sensor for the vehicle, with which the vehicle is retrofitted after manufacture. The OBD(s) can include or be a part of the sensor sub-system referenced below by numeral 60.

The vehicle controller system 20, which in contemplated embodiments includes one or more microcontrollers, can communicate with OBDs via a controller area network (CAN). The CAN message-based protocol is typically designed for multiplex electrical wiring with automobiles, and CAN infrastructure may include a CAN bus. The OBD can also be referred to as vehicle CAN interface (VCI) components or products, and the signals transferred by the CAN may be referred to as CAN signals. Communications between the OBD(s) and the primary controller or microcontroller 20 are in other embodiments executed via similar or other message-based protocol.

The vehicle 10 also has one or more mounting structures 35. The mounting structures 35 may include any of a central console, a dashboard, and an instrument panel. The mounting structures 35 may include a plug-in port 36—a USB port, for instance—and a visual display 37, such as a touch-sensitive, input/output, human-machine interface (HMI).

The vehicle 10 also has a sensor sub-system 60 including sensors providing information to the controller system 20. The sensor input to the controller 20 is shown schematically at the right, under the vehicle hood, of FIG. 2. Example sensors having base numeral 60 ($60_1$, $60_2$, etc.) are also shown.

Sensor data relates to features such as vehicle operations, vehicle position, and vehicle pose, driver characteristics, such as biometrics or physiological measures, and environmental-characteristics pertaining to a vehicle interior or outside of the vehicle 10.

Example sensors include a camera $60_1$ positioned (i) behind the steering wheel aimed at the driver's face or (ii) at a rear-view mirror of the vehicle 10 and directed at the driver's face, a dome or ceiling camera $60_2$ positioned in a header of the vehicle 10 and directed at the driver's face, a world-facing camera $60_3$ (facing away from vehicle 10), and a world-facing range sensor $60_4$. Intra-vehicle-focused sensors $60_1$, $60_2$, such as cameras, and microphones, are configured to sense presence or people, activities or people, or other cabin activity or characteristics. The sensors can also be used for authentication purposes, in a registration or re-registration routine. This subset of sensors are described more below.

World-facing sensors $60_3$, $60_4$ sense characteristics about an environment 11 comprising, for instance, billboards, buildings, other vehicles, traffic signs, traffic lights, pedestrians, etc.

The OBDs mentioned can be considered as local devices, sensors of the sub-system 60, or both in various embodiments.

Mobile or local computing devices 34 (e.g., driver phone, driver wearable, or driver plug-in device) can be considered as sensors 60 as well, such as in embodiments in which the vehicle 10 uses data provided by the local device based on output of a local-device sensor(s). The vehicle system can use data from a driver smartphone, for instance, indicating driver-physiological data sensed by a biometric sensor of the phone.

The vehicle 10 also includes cabin output components 70, such as sound speakers $70_1$, and an instruments panel or display $70_2$. The output components may also include dash or center-stack display screen $70_4$, a rear-view-mirror screen $70_3$ (for displaying imaging from a vehicle aft/backup camera), and any vehicle visual display device 37.

III. ON-BOARD COMPUTING ARCHITECTURE—FIG. 2

Figure 2:
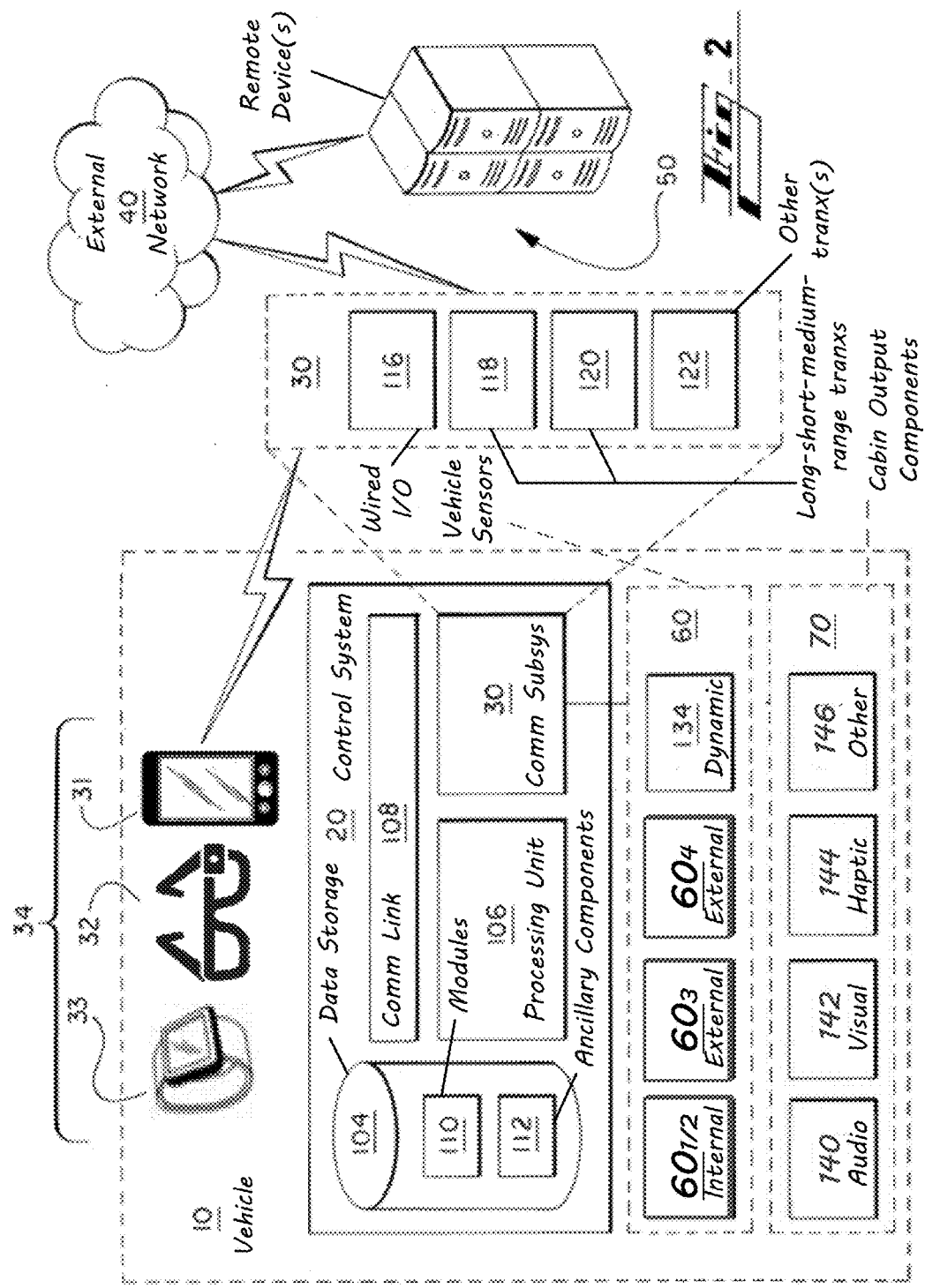
FIG. 2 illustrates schematically more details of the example vehicle computer of FIG. 1 in communication with the local and remote computing devices.

FIG. 2 illustrates in more detail the hardware-based computing or controller system 20 of FIG. 1. The controller system 20 can be referred to by other terms, such as computing apparatus, controller, controller apparatus, or such descriptive term, and can be or include one or more microcontrollers, as referenced above.

The controller system 20 is in various embodiments part of the mentioned greater system 10, such as a vehicle.

The controller system 20 includes a hardware-based computer-readable storage medium, or data storage device 104 and a hardware-based processing unit 106. The processing unit 106 is connected or connectable to the computer-readable storage device 104 by way of a communication link 108, such as a computer bus or wireless components.

The processing unit 106 can be referenced by other names, such as processor, processing hardware unit, or the like.

The processing unit 106 can include or be multiple processors, which could include distributed processors or parallel processors in a single machine or multiple machines. The processing unit 106 can be used in supporting a virtual processing environment.

The processing unit 106 could include a state machine, application specific integrated circuit (ASIC), or a programmable gate array (PGA) including a Field PGA, for instance. References herein to the processing unit executing code or instructions to perform operations, acts, tasks, functions, steps, or the like, could include the processing unit performing the operations directly and/or facilitating, directing, or cooperating with another device or component to perform the operations.

In various embodiments, the data storage device 104 is any of a volatile medium, a non-volatile medium, a removable medium, and a non-removable medium.

The term computer-readable media and variants thereof, as used in the specification and claims, refer to tangible storage media. The media can FIG. 2 illustrates in more detail the hardware-based computing or controller system 20 of FIG. 1. The controller system 20 can be referred to by other terms, such as computing apparatus, controller, controller apparatus, or such descriptive term, and can be or include one or more microcontrollers, as referenced above.

The controller system 20 is in various embodiments part of the mentioned greater system 10, such as a vehicle.

The controller system 20 includes a hardware-based computer-readable storage medium, or data storage device 104 and a hardware-based processing unit 106. The processing unit 106 is connected or connectable to the computer-readable storage device 104 by way of a communication link 108, such as a computer bus or wireless components.

The processing unit 106 can be referenced by other names, such as processor, processing hardware unit, or the like.

The processing unit 106 can include or be multiple processors, which could include distributed processors or parallel processors in a single machine or multiple machines. The processing unit 106 can be used in supporting a virtual processing environment.

The processing unit 106 could include a state machine, application specific integrated circuit (ASIC), or a programmable gate array (PGA) including a Field PGA, for instance. References herein to the processing unit executing code or instructions to perform operations, acts, tasks, functions, steps, or the like, could include the processing unit performing the operations directly and/or facilitating, directing, or cooperating with another device or component to perform the operations.

In various embodiments, the data storage device 104 is any of a volatile medium, a non-volatile medium, a removable medium, and a non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 104 includes one or more storage modules 110 storing computer-readable code or instructions executable by the processing unit 106 to perform the functions of the controller system 20 described herein. The modules and functions are described further below in connection with FIGS. 4 and 5.

The data storage device 104 in some embodiments also includes ancillary or supporting components 112, such as additional software and/or data supporting performance of the processes of the present disclosure, such as one or more driver profiles or a group of default and/or driver-set preferences.

As provided, the controller system 20 also includes a communication sub-system 30 for communicating with mobile or local computing devices 34, remote systems 50, and networks 40. The communication sub-system 30 in various embodiments includes any of a wire-based input/output (i/o) 116, at least one long-range wireless transceiver 118, and one or more short- and/or medium-range wireless transceivers 120. Component 122 is shown by way of example to emphasize that the system can be configured to accommodate one or more other types of wired or wireless communications.

The long-range transceiver 118 is in some embodiments configured to facilitate communications between the controller system 20 and a satellite and/or a cellular telecommunications network, which can be considered also indicated schematically by reference numeral 40.

The short- or medium-range transceiver 120 is configured to facilitate short- or medium-range communications, such as communications with other vehicles, in vehicle-to-vehicle (V2V) communications, and communications with transportation system infrastructure (V2I). Broadly, vehicle-to-entity (V2X) can refer to short-range communications with any type of external entity (for example, devices associated with pedestrians or cyclists, etc.).

To communicate V2V, V2I, or with other extra-vehicle devices, such as local communication routers, etc., the short- or medium-range communication transceiver 120 may be configured to communicate by way of one or more short- or medium-range communication protocols. Example protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

By short-, medium-, and/or long-range wireless communications, the controller system 20 can, by operation of the processor 106, send and receive information, such as in the form of messages or packetized data, to and from the communication network(s) 40.

Remote systems 50 with which the sub-system 30 communicates are in various embodiments nearby the vehicle 10, remote to the vehicle, or both.

The remote systems 50 can be configured with any suitable structure for performing the operations described herein. Example structure includes any or all structures like those described in connection with the vehicle computing device 20. A remote systems 50 includes, for instance, a processing unit, a storage medium comprising modules, a communication bus, and an input/output communication structure. These features are considered shown for the remote system 50 by FIG. 1 and the cross-reference provided by this paragraph.

While mobile or local computing devices 34 are shown within the vehicle 10 in FIGS. 1 and 2, any of them may be external to the vehicle and in communication with the vehicle.

Example remote systems 50 include a remote server (for example, application server), or a remote data, customer-service, and/or control center. A mobile or local computing devices 34, such as a driver computing or electronic device, such as a smartphone, can also be remote to the vehicle 10, and in communication with the sub-system 30, such as by way of the Internet or other communication network 40.

An example control center is the OnStar® control center, having facilities for interacting with vehicles and drivers, whether by way of the vehicle or otherwise (for example, mobile phone) by way of long-range communications, such as satellite or cellular communications. ONSTAR is a registered trademark of the OnStar Corporation, which is a subsidiary of the General Motors Company.

As mentioned, the vehicle 10 also includes a sensor sub-system 60 comprising sensors providing information to the controller system 20 regarding items such as vehicle operations, vehicle position, vehicle pose, driver characteristics, such as biometrics or physiological measures, and/or the environment about the vehicle 10. The arrangement can be configured so that the controller system 20 communicates with, or at least receives signals from sensors of the sensor sub-system 60, via wired or short-range wireless communication links 116, 120.

In various embodiments, the sensor sub-system 60 includes at least one camera and at least one range sensor $60_4$, such as radar or sonar, directed away from the vehicle, such as for supporting autonomous driving. In some embodiments a camera is used to sense range.

Visual-light cameras $60_3$ directed away from the vehicle 10 may include a monocular forward-looking camera, such as those used in lane-departure-warning (LDW) systems. Embodiments may include other camera technologies, such as a stereo camera or a trifocal camera.

Sensors configured to sense external conditions may be arranged or oriented in any of a variety of directions without departing from the scope of the present disclosure. For example, the cameras $60_3$ and the range sensor $60_4$ may be oriented at each, or a select, position of, (i) facing forward from a front center point of the vehicle 10, (ii) facing rearward from a rear center point of the vehicle 10, (iii) facing laterally of the vehicle from a side position of the vehicle 10, and/or (iv) between these directions, and each at or toward any elevation, for example.

The range sensor $60_4$ may include a short-range radar (SRR), an ultrasonic sensor, a long-range radar, such as those used in autonomous or adaptive-cruise-control (ACC) systems, sonar, or a Light Detection And Ranging (LiDAR) sensor, for example.

Other example sensor sub-systems 60 include the mentioned cabin sensors ($60_1$, $60_2$, etc.) configured and arranged (e.g., positioned and fitted in the vehicle) to sense activity, people, cabin environmental conditions, or other features relating to the interior of the vehicle. Example cabin sensors ($60_1$, $60_2$, etc.) include microphones, in-vehicle visual-light cameras, seat-weight sensors, driver salinity, retina or other driver characteristics, biometrics, or physiological measures, and/or the environment about the vehicle 10.

The cabin sensors ($60_1$, $60_2$, etc.), of the vehicle sensors 60, may include one or more temperature-sensitive cameras (e.g., visual-light-based (3D, RGB, RGB-D), infra-red or thermographic) or sensors. In various embodiments, cameras are positioned preferably at a high position in the vehicle 10. Example positions include on a rear-view mirror and in a ceiling compartment.

A higher positioning reduces interference from lateral obstacles, such as front-row seat backs blocking second- or third-row passengers, or blocking more of those passengers. A higher positioned camera (light-based (e.g., RGB, RGB-D, 3D, or thermal or infra-red) or other sensor will likely be able to sense temperature of more of each passenger's body—e.g., torso, legs, feet.

Two example locations for the camera(s) are indicated in FIG. 1 by reference numeral $60_1$, $60_2$, etc. —one at rear-view mirror and one at the vehicle header. As mentioned above, the camera(s) can be positioned in any suitable manner for sensing the driver, and in embodiments the driver's face, particularly. For instance, example sensors include a camera $60_1$ positioned (i) behind the steering wheel aimed at the driver's face or (ii) at a rear-view mirror of the vehicle 10 and directed at the driver's face, a dome or ceiling camera $60_2$ positioned in a header of the vehicle 10 and directed at the driver's face.

Other example sensor sub-systems 60 include dynamic vehicle sensors 134, such as an inertial-momentum unit (IMU), having one or more accelerometers, a wheel sensor, or a sensor associated with a steering system (for example, steering wheel) of the vehicle 10.

The sensors 60 can include any sensor for measuring a vehicle pose or other dynamics, such as position, speed, acceleration, or height—e.g., vehicle height sensor.

The sensors 60 can include any known sensor for measuring an environment of the vehicle, including those mentioned above, and others such as a precipitation sensor for detecting whether and how much it is raining or snowing, a temperature sensor, and any other.

Sensors for sensing driver characteristics include any biometric sensor, such as a camera used for retina or other eye-feature recognition, facial recognition, or fingerprint recognition, a thermal sensor, a microphone used for voice or other driver recognition, other types of driver-identifying camera-based systems, a weight sensor, breath-quality sensors (e.g., breathalyzer), a driver-temperature sensor, electrocardiogram (ECG) sensor, Electrodermal Activity (EDA) or Galvanic Skin Response (GSR) sensors, Blood Volume Pulse (BVP) sensors, Heart Rate (HR) sensors, electroencephalogram (EEG) sensor, Electromyography (EMG), and driver-temperature, a sensor measuring salinity level, vehicle-cabin $CO_2$ sensor, vehicle humidity sensor, other types of vehicle air-quality sensors (VOC, etc.), or the like.

Driver-vehicle interfaces, such as a touch-sensitive display 37, buttons, knobs, or the like can also be considered part of the sensor sub-system 60.

FIG. 2 also shows the cabin output components 70 mentioned above. The output components in various embodiments include a mechanism for communicating with vehicle occupants. The components include but are not limited to audio speakers 140, visual displays 142, such as the instrument panel, center-stack display screen, and rear-view-mirror screen, and haptic outputs 144, such as steering wheel or seat vibration actuators. The fourth element 146 in this section 70 is provided to emphasize that the vehicle can include any of a wide variety of other output components, such as components providing an aroma or light into the cabin.

IV. EXAMPLE LOCAL OR MOBILE COMPUTING DEVICE 34—FIG. 3

Figure 3:
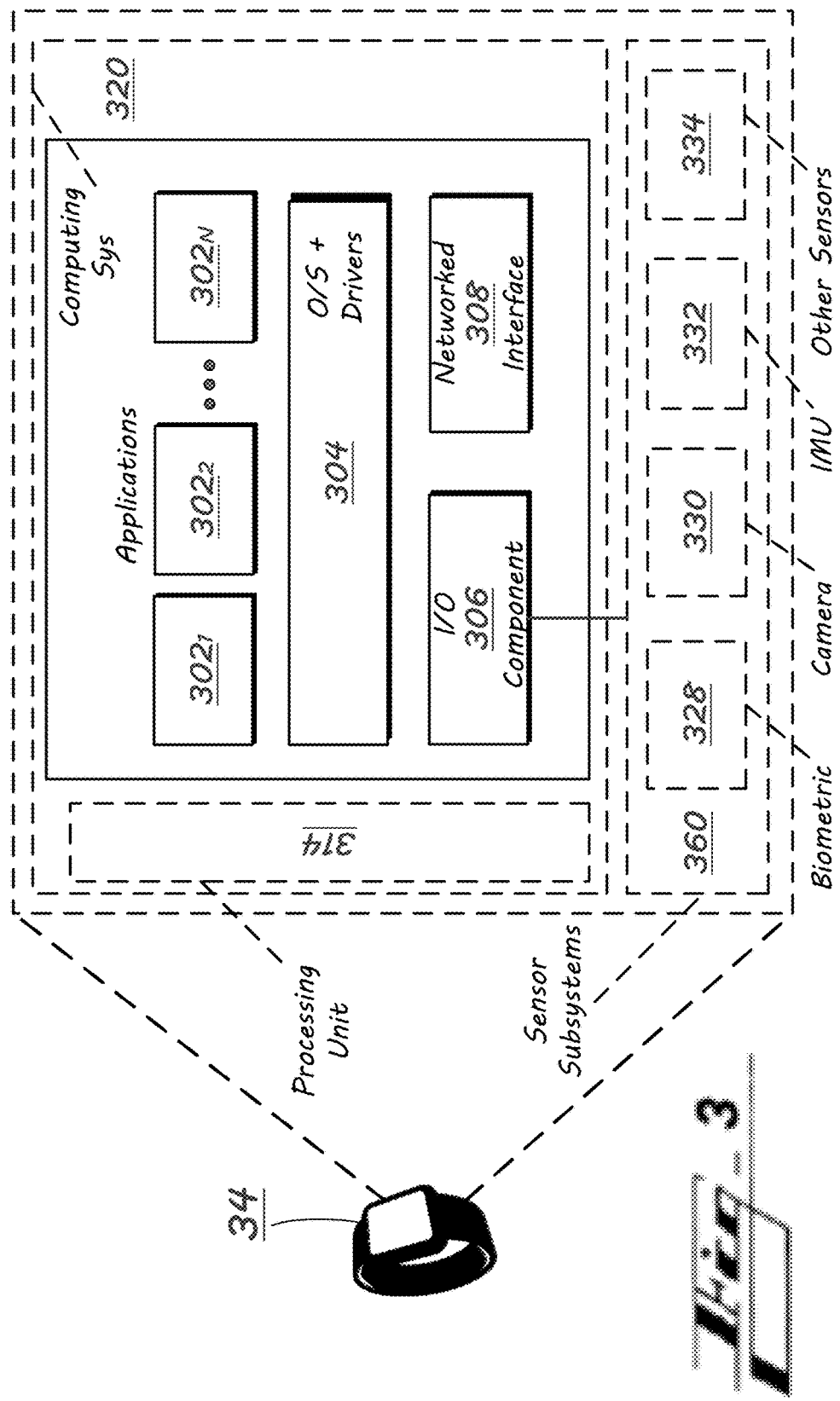
FIG. 3 illustrates schematically components of an example personal or add-on computing device being, by way of example, a driver wearable, and particularly a smartwatch.

FIG. 3 illustrates schematically components of an example mobile or local computing devices 34 of FIGS. 1 and 2, with the particular example being the wearable watch 33.

The mobile or local computing devices 34 can be referred to as an add-on device or other terms, such as a driver device, a local device, an add-on device, a personal device, a plug-in device, an ancillary device, system, or apparatus. The term mobile or local computing devices 34 is used primarily herein because the mobile or local computing device 34 is not an original part of the system(s), such as the vehicle 10, with which the mobile or local computing device 34 is used.

The mobile or local computing devices 34 are configured with any suitable structure for performing the operations described for them. Example structure includes any of the structures described in connection with the vehicle computing device 20, such as a hardware-based computer-readable storage medium, or data storage device, like the device 104 of FIG. 2, and also includes a hardware-based processing unit (like the unit 106 of FIG. 2) connected or connectable to the computer-readable storage device by way of a communication link (like link 108), such as a computer bus or wireless structures. The data storage device can be in any way like the device 104 described above in connection with FIG. 2—for example, the data storage device of the mobile or local computing devices 34 can include one or more storage or code modules storing computer-readable code or instructions executable by the processing unit of the add-on device to perform the functions of the hardware-based controlling apparatus described herein, or the other functions described herein. The data storage device of the add-on device in various embodiments also includes ancillary or supporting components, like those 112 of FIG. 2, such as additional software and/or data supporting performance of the processes of the present disclosure, such as one or more driver profiles or a group of default and/or driver-set preferences. The code modules supporting components are in various embodiments components of, or accessible to, one or more add-on device programs, such as the applications 302 described next.

With reference to FIG. 3, for instance, the example mobile or local computing devices 34 is shown to include, in addition to any analogous features to those shown in FIG. 1 for the vehicle computing system 20:

Applications $302^1$, $302^2$, . . . $302^N$;
An operating system and device drivers 304;
An input, or input/output, component 306 for communication with local sensors, peripherals, and apparatus beyond the device computing system 320; and
A networked interface component 308 for acting as a server to a vehicle client (of the vehicle system 20), for local sensor data from local sensors 360 to the vehicle. The networked interface component is described further below. In a contemplated embodiment the networked interface component is configured to instead or also include features enabling the component to act as a client, receiving vehicle data (e.g., driver-state data) and acting on the data, such as making a determination about driver impairment or about resulting actions to take—alert provision, driver profile updating, etc.
Hardware-based processing unit 314.
And the mobile or local computing devices 34 can include respective sensor sub-systems 360. Example sensors are indicated by 328, 330, 332, 334.

In various embodiments, the sensor sub-system 360 includes at least one biometric sensor 328, such as a heart-rate (HR) sensor, a microphone for voice analysis, a salinity sensor, a breath-quality sensor (e.g., breathalyzer), a driver-temperature sensor, an Electrocardiogram (ECG) sensor, Electrodermal Activity (EDA) or Galvanic Skin Response (GSR) sensors, a Blood Volume Pulse (BVP) sensor, an electroencephalogram (EEG) sensor, an Electromyography (EMG), or such sensor(s) for measuring biometric or physiological characteristics of the driver, vehicle-cabin $CO_2$ sensor, vehicle humidity sensor, other types of vehicle air-quality sensors (VOC, etc.), or the like.

The sensors can also include a user-facing and a world-facing camera, both indicated schematically by reference numeral 330.

The sensors can also include an inertial-momentum unit (IMU) 332, such as one having one or more accelerometers. These sensors can be used for various purposes, such as to analyze a driver's face (eye blink rate, expressions, etc.), movement activity, gestures, or other driver features which may directly or indirectly indicate drowsiness, fatigue, anxiety, or other impairing condition.

Another sensor 334 is provided to indicate one or more other sensors that the mobile or local computing devices 34 can include, especially those which may indicate driver impairment.

Any sensor can include or be in communication with a supporting program. The program can be considered illustrated by the sensor icon 334, or by data structures such as one of the applications $302_N$. As an example, an aftermarket mobile or local computing device 34 can include a facial-recognition program $302_1$ processing image data from the camera(s) 330. Similar relationships (sensor/local program) can exist regarding any of the sensors or programs described herein.

Further regarding the referenced networked interface component, or client/server component, in various embodiments, the component includes or is operationally connected with a module or sub-module of a dynamic programming language (DPL) at the add-on device matching a corresponding server/client component or module/sub-module of the vehicle system 20. Example DPL includes such as JavaScript, Java or a C/C++ programming language. Devices with which the vehicle computing device 20 interacts for executing functions of the present technology include corresponding DPL module or sub-module for use in inter-device communications—e.g., between each mobile or local computing devices 34 and the vehicle 10 or another personal device. The module in some implementations includes an application framework, such as from a media or entertainment application, a security-related application, a navigation, traffic or weather application, another application of the host device, and/or an application manager for managing operations of any such application at the host device. DPL code in various embodiments defines settings for communications between respective devices, such as parameters of one or more application program interfaces (APIs) by which the devices will communicate. The networked-device engine(s) and/or DPL arrangement(s) facilitate what can be referred to as device arbitration. Though the mobile or local computing devices 34, or add-on device, has its own processors and operating systems, it can behave as a peripheral of the vehicle system 10, wherein the two 34/10 inter-operate seamlessly. In some implementations, the seamless operation is executed in a substantially similar manner (e.g., processing speed, resource use, etc.) as if the device receiving data (e.g., the vehicle system 20, receiving add-on-device data regarding driver physiology), or virtualizing, the resource (e.g., add-on-device biometric sensor), had the resource natively.

V. ADDITIONAL VEHICLE COMPONENTS—FIG. 4

FIG. 4 shows an alternative view 400 of the vehicle 10 of FIGS. 1 and 2 emphasizing example memory components, and showing associated devices, such as example mobile or local computing devices 34, e.g., add-on device, referenced above.

As mentioned, the data storage device 104 includes one or more modules 110 for performance, by execution by the processing unit 106, of the processes of the present disclosure. The device 104 may include ancillary components 112, such as additional software and/or data supporting performance of the processes of the present disclosure. The ancillary components 112 can include, for example, additional software and/or data supporting performance of the processes of the present disclosure, such as one or more driver profiles or a group of default and/or driver-set preferences.

Any of the code or instructions described can be part of more than one module. And any functions described herein can be performed by execution of instructions by the processing unit 106 in one or more modules, though the functions may be described primarily in connection with one module by way of primary example. Each of the modules can be referred to by any of a variety of names, such as by a term or phrase indicative of its function.

Sub-modules can cause the processing hardware-based unit 106 to perform specific operations or routines of module functions. Each sub-module can also be referred to by any of a variety of names, such as by a term or phrase indicative of its function.

Example modules 110 shown include:
 Input Group 410
  an input-interface or sensing module 412;
  a database module 414; and
  a driver-profile learning module 416;
 Activity Group 420
  a drowsiness analysis module 422;
  a fatigue analysis module 424;
  an anxiety analysis module 426; and
  a composite analysis module 428
 Output Group 430
  a driver-notification module 432;
  a vehicle-adaptation or vehicle-control module 434; and
  external communications module 436.

Other vehicle components shown in FIG. 4 include the vehicle communications sub-system 30 and the vehicle sensor sub-system 60. These sub-systems act at least in part as input sources to the modules 110, and particularly to the input interface module 412. Example inputs from the communications sub-system 30 include identification signals from mobile devices, which can be used to identify or register a mobile device, and so the corresponding driver, to the vehicle 10, or at least preliminarily register the device/driver to be followed by a higher-level registration.

The communications sub-system 30 receives and provides to the input group 410 data from any of a wide variety of sources, including sources separate from the vehicle 10, such as sensor data from mobile or local computing devices 34, devices worn by pedestrians, other vehicle systems, local infrastructure (local beacons, cellular towers, etc.), satellite systems, and remote systems 50, providing any of a wide variety of information, such as driver-identifying data, driver-history data, driver selections or driver preferences contextual data (weather, road conditions, navigation, etc.), program or system updates. Remote systems can include, for instance, applications servers corresponding to application(s) operating at the vehicle 10 and any relevant mobile or local computing devices 34, e.g., of the vehicle driver, computers of a driver or supervisor (parent, work supervisor), vehicle-operator servers, customer-control center system, such as systems of the OnStar 0 control center mentioned, or a vehicle-operator system, such as that of a taxi company operating a fleet to which the vehicle 10 belongs, or of an operator of a ride-sharing service.

Example inputs from the vehicle sensor sub-system 60 include and are not limited to:
 bio-metric/physiological sensors providing bio-metric data regarding vehicle occupants, such as movement activity, facial features, voice recognition, heart rate, salinity, skin or body temperature for each occupant, etc.;
 vehicle-occupant input devices, such as human-machine interfaces (HMIs), such as a touch-sensitive screen, buttons, knobs, microphones, and the like;
 cabin sensors providing data about characteristics within the vehicle, such as vehicle-interior temperature, in-seat weight sensors, and motion-detection sensors; $CO_2$ and other in-cabin air quality sensors; and
 environment sensors providing data bout conditions about a vehicle, such as from external camera and distance sensors (e.g., LiDAR, radar).

The view also shows example vehicle outputs 70, and mobile or local computing devices 34, e.g., of the vehicle driver, that may be positioned in the vehicle 10. Outputs 70 include and are not limited to:
 audio-output component, such as vehicle speakers;
 visual-output component, such as vehicle screens;
 vehicle-dynamics actuators, such as those affecting autonomous driving (vehicle brake, throttle, steering);
 vehicle-climate actuators, such as those controlling HVAC system temperature, humidity, zone outputs, and fan speed(s); and
 mobile or local computing devices 34 and remote systems 50, to which the system may provide a wide variety of information, such as driver-identifying data, driver-biometric data, driver-history data, contextual data (weather, road conditions, etc.), instructions or data for use in providing notifications, alerts, or messages to the driver or relevant entities such as authorities, first responders, parents, an operator or owner of a subject vehicle 10, or a customer-service center system, such as of the OnStar® control center.

The modules, sub-modules, and their functions are described more below.

VI. ALGORITHMS AND PROCESSES—FIG. 5

VI.A. Introduction to the Algorithms

FIG. 5 shows an example algorithm, process, or routine represented schematically by a flow 500, according to embodiments of the present technology. The algorithms, processes, and routines are at times herein referred to collectively as processes or methods for simplicity.

Though a single process 500 flow is shown for simplicity, any of the functions or operations can be performed in one or more or processes, routines, or sub-routines of one or more algorithms, by one or more devices or systems.

It should be understood that the steps, operations, or functions of the processes are not necessarily presented in any particular order and that performance of some or all the operations in an alternative order is possible and is contemplated. The processes can also be combined or overlap, such as one or more operations of one of the processes being performed in the other process.

The operations have been presented in the demonstrated order for ease of description and illustration. Operations can be added, omitted and/or performed simultaneously without departing from the scope of the appended claims. It should also be understood that the illustrated processes can be ended at any time.

In certain embodiments, some or all operations of the processes and/or substantially equivalent operations are performed by a computer processor, such as the hardware-based processing unit 106, a processing unit of an add-on, and/or the unit of a remote device, executing computer-executable instructions stored on a non-transitory computer-readable storage device of the respective device, such as the data storage device 104 of the vehicle system 20.

The process can end or any one or more operations of the process can be performed again.

VI.B. System Components and Functions

FIG. 5 shows the components of FIG. 4 interacting according to various exemplary algorithms and process flows.

The input group 410 includes the input-interface module 412, the database module 414, and the driver-profile learning module 416. Input group modules interact with each other in various ways to accomplish the functions of the present technology.

The input interface module 412, executed by a processor such as the hardware-based processing unit 106, receives any of a wide variety of input data or signals, including from the sources described in the previous section (V.).

Input sources include vehicle sensors 60 and mobile or local computing devices 34 or remote systems 50, such as data storage components thereof, via the vehicle communication sub-system 30. Inputs also include a vehicle database, via the database module 414.

The database module 414 in various embodiments stores data received, generated, pre-collected, or pre-generated regarding the driver. The data can be stored in a driver profile. The driver profile can be part of, or accessible by, one or more relevant applications 302.

The driver profile includes data indicative of past interactions with the driver. Data that is generated based on prior activity can be referred to as historic data. Historic data can include or be used to generate other driver-profile data.

Example driver-profile data includes and is not limited to the following:

Baseline or normative driver data. The profile can include data indicating characteristics of the driver when the driver is not impaired. The baseline data can relate to driver physiology (HR, etc.), reaction time, whether regarding driving or some simulation or test, driver facial features, behavior, such as a sleep profile or pattern—e.g., typical amount of sleep for the person, mannerisms, gestures, eye blinking patterns, or the like. Driver behaviors can also include eating habits, as another example. The data can also indicate medications that the driver takes, and in some implementations can also include characteristics about the driver when the driver is on, and not on, the medications. As another example, the data can indicate whether the driver is in a special group or class, such as by having a medical condition affecting alertness, such as a condition causing more-than average drowsiness or fatigue levels, such as sleep apnea. The system can use the baseline data in analyzing subsequent measurements or driver activity and determining whether there is an apparent impairment, or an extent of impairment. Further regarding the test or simulation mentioned, in one embodiment, the same or similar test or simulation is performed in real time, such as before the driver can start driving, to determine fitness of driver vis-à-vis the test/simulation baseline. Other factors, such as quality of recent sleep can be considered as well as the test, and the test in some implementations is performed only in response to a determination that a threshold factor or factors is not met, such as if sleep data from a driver wearable indicates that the driver did not sleep as much as recommended recently. Normative driver data can also be generated with consideration given to data about the driver and about others, such as by setting or adjusting driver data with respect to age, noticing that the driver age is above a median age range for drivers in the country, and so the driver is expected to have slower reaction times.

Driver preferences and other vehicle settings. To the extent that the system designer includes them, the system can include driver settings that the driver can adjust. These can include any of a variety of settings. Examples include: types of alerts provided in apparent impairment situations—e.g., tone, volume, and features of visual alerts, or contact information for people or systems to be contacted in connection with apparent impairment situations. Some settings may not be adjustable by the driver. Adjustable settings are discussed further below in connection with operation of the output group 430. Preferences can also include any settings affecting a manner by which the system interacts with the driver or interacts (shares data) with a non-vehicle system, such as a server or driver device.

Past actions taken. The driver profile data can include data indicating actions taken in operations relating to the driver, such as past fitness-to-drive determinations, such as fitness-to-drive scores, levels, or ratings, and alerts provided, or communications sent to others, such as a parent, vehicle fleet owner, authorities, or customer service center, such as the OnStar® center, and the underlying circumstances—e.g., time, and related driver characteristics and/or behavior. Other example actions include autonomous driving actions, such as by changing to a higher level or fully autonomous driving, and underlying circumstances.

Associations between driver characteristics and driver performance, or other learned information. The association may connect (i) a particularly driver characteristic, such as length or quality of sleep measured the prior night, which may indicate drowsiness or fatigue, for instance, to (2) driver performance sensed at or around the same time as the HR measurements, such as regarding driver reaction time, which may indicate a delayed reaction time, for instance. The data may include time information, indicating a time at which the association was determined. The association can relate a driver health condition with past performance, such as number or extent of unintended lane departures, number or extent of hard braking actuations, response time at the steering wheel, brake or throttle, or accidents. And may include an association to time, such as how the driver performs (e.g., reaction time) at certain times of day or night. Driving that occurs during an atypical time (e.g., earlier/later than when the driver typically drives or during a typical sleep time) may trigger additional scrutiny or assumptions related to a person's fitness to drive. By generating such information, or learning, the system becomes personalized to the driver, resulting in more accurate results of analysis, fewer "cry wolf" notifications of low levels of driver fitness, and possibly also of alerting and other actions (e.g., timing of autonomous takeover) taken.

Associations between driver characteristics and other driver health factors. The association may connect (i) a particular driver characteristic, such as hear-rate profile measured, to (ii) another health factor such as quality of sleep. As an example use, if the system associates two conditions based on sufficient information, then the system can deduce the presence of one based on presence of the other. If the driver heart rate has a certain profile on each of multiple times that the driver sleeps very poorly, and does not have the profile when the driver sleeps well, a useful association can be made between the HR profile and poor sleep.

Associations between driver characteristics and fitness-to-drive determinations. The association may connect (1) a particularly driver characteristic, such as heart-rate profile measured, to (2) a fitness determination made on a past occasion by the system, such as a score, level, or fit/not-fit determination assigned or determined in connection with the particular driver characteristic.

Driver reaction to stimuli. The data may indicate how the driver reacted to a stimulus, such as an alert of apparent drowsiness while driving. The data may show that the driver reacted well in response to a prior alert, when HR measures indicated drowsiness, such as by stopping at a rest area, and having better HR measurements for the driver thereafter. Or the data may show how the driver changed behavior in response to an alert or message, such as by not driving in the first place, taking a nap, getting more sleep, eating better, etc. Or the data may show that some alerts were more effective than others in obtaining desired driver behavior, such as pulling over, as mentioned, not driving in the first place, taking a nap, getting more sleep, eating better, etc.

Data of the database module 414 also includes data indicating present driver characteristics.

Data indicating present driver characteristics can be received from any of a wide variety of sources, such as:
vehicle sensors or HMIs;
wearable sensors;
other driver device sensor or HMI (e.g. smartphone);
driver input, such as via dialog or other input by way of a vehicle or driver device HMI;
3rd party input, such as by a parent, authority of a commercial fleet operation, sleep specialist via dialog or other input by way of a vehicle or driver device HMI, etc.;
a remote measuring device. An example remote device is a bed configured to measure driver characteristics (e.g., HR, sleep pattern, etc.) when the driver is in the bed. The data can be received by an acting system—e.g., vehicle, phone, or remote server app, such as via the internet, using a cloud or internet-of-things (IOT) arrangement.
a local or remote data storage, such as a driver smart phone or remote customer service center such as the OnStar® system.

Example present driver characteristics, or driver health information, include and are not limited to:
measure of a driver physiological or biometric characteristic, such as of a driver's heart rate (HR), electroencephalogram (EEG), voice, gestures, salinity, breath, temperature, electrocardiogram (ECG), Electrodermal Activity (EDA) or Galvanic Skin Response (GSR), Blood Volume Pulse (BVP), Electromyography (EMG), or the like.
driver behavior or feature, such as amount or quality of recent sleep, gestures, head or eye movement (e.g., blinking or closing of the eyes), bodily movement activity, facial features, statements, or utterances of the driver.
driver context, such as recent diet, or medications taken or not taken.
a driver-state determination, such as a drowsiness or lack of sleep determination, such as in a message or signal from a bed, via the internet, for instance, configured like that mentioned above, or a fatigue or anxiety determination made by an external system.

In various embodiments, the database module 414 also includes data indicating other relevant context. Example data indicating relevant context includes and is not limited to data indicating:
time of day/night;
weather;
length of drive/trip;
road type (e.g., those more likely to induce drowsiness)
road conditions;
presence of passengers;
traffic;
travelling speeds or other conditions in a local area or on a predicted or recommended travel route;
passenger features (number of passengers, identities, demographics, for instance);
Button/control/speech activity levels; and
Cabin conditions, such as $CO_2$ levels, CO levels, humidity, presence of allergens, presence of other occupants, etc.

The learning module 416 processes data received by the input interface module 412 and from the database module 414 to generate learned data particular to the driver. The learned data can include, be used as, and/or be used in generating historic data about the driver.

As referenced above regarding data via the database module 414, the learning functions in various embodiments include determining relationship between conditions and driver performance, such as between driver a certain HR measurement and driver performance, such as reaction time.

For performing such functions, the learning module 416 in various embodiments is configured to include artificial intelligence, computational intelligence heuristic structures, or the like.

By learning particular characteristics, behaviors, tendencies, and/or other qualities related to the driver, the system becomes more personalized, resulting in more accurate system performance. More accurate system performance includes, for instance, (i) more-accurate determinations regarding fitness to driver in view of apparent drowsiness, fatigue, or anxiety levels, lowering false alerts, (ii) more-effective provision of alerts or notifications to the driver or others, such as by obtaining better results, such as the driver pulling over and resting as recommended under present conditions; and (iii) more-effective changes to vehicle dynamic operations, such as more timely escalation of vehicle driving to a higher or full automated level.

Output of the input interface and learning modules 412, 416 may be stored via the database module 414, for instance, and the learning module 416 considers data from the database module 414.

Data received can include, for instance, driver profile data indicating preferences and historic activity of a vehicle driver or drivers.

Data received is stored at the memory 104 via the database module 414.

Input-group data is passed on to the activity group 420.

As referenced above and shown in FIGS. 4 and 5, the activity group 420 includes the drowsiness analysis module 422, the fatigue analysis module 424, the anxiety analysis module 426, and the composite analysis module 428.

The drowsiness analysis module 422 is configured to determined, using data from the input group 410, whether the driver is too drowsy or sleepy to drive, or at least to determine a score or other indicator relating to a present drowsiness level of the driver. Input data includes driver profile data and present health information, and in some cases the other context data mentioned.

The fatigue analysis module 424 is configured to determined, using data from the input group 410, whether the driver is too fatigued or tired to drive, or at least to determine a score or other indicator relating to a present fatigue level of the driver. A driver can be impaired to drive based on being fatigued, such as by working too hard prior to driving or driving too long, even if they are not drowsy or otherwise impaired. Input data includes driver profile data and present health information, and in some cases the other context data mentioned.

The anxiety analysis module 426 is configured to determined, using data from the input group 410, whether the driver is too anxious or stressed to drive, or at least to determine a score or other indicator relating to a present anxiety level of the driver. A driver can be impaired to drive based on being stressed, even if they are not drowsy or otherwise impaired. Input data includes driver profile data and present health information, and in some cases the other context data mentioned.

In various embodiments, the activity group 420 includes a composite analysis module 428. The composite module 428 in some embodiments performs all of the functions described in connection with the other activity-group modules 422, 424, 426, which could in that case be considered sub-modules, wherein each need not be present, and others sub-modules, such as an intoxication analysis module, could be present, in various implementations of the technology.

The modules collectively, or any one or more of them, can be referred to generally as an activity module. The activity module can analyze drowsiness and fatigue in one embodiment, or drowsiness and stress in another, for instance.

In a contemplated embodiment, the composite module 428 receives results from other activity group modules 422, 424, 426 and prepares activity group output based on those results.

Whether at the composite module 428 and/or the other group modules 422, 424, 426, the system determines a present fitness to drive regarding the driver, such as a conclusion of whether they are fit to drive or impaired, and/or a level, score or other factor or indicator relating to fitness or impairment to drive.

The system can be configured with any of a wide variety of manners to distinguish between levels of fitness or impairment. As an easy example, the system can include a positive, fit-to-drive, level, and a negative, apparently impaired, level.

In another example, the system is programmed with three, four, five, or more levels along a continuum. And any one or more of the levels can be assigned to corresponding conclusions. For instance, in a four-level arrangement, it may be that levels 1 and 2 constitute a safe, fit-to-drive, zone, and levels 3 and 4 constitute an alert zone, with level 3 (e.g., large separation distance warning) corresponding to apparently or likely impaired, and level 4 (e.g., very large distance separation warning) corresponding to more clearly impaired.

The activity group can be configured to perform at any of a variety of timings. The system can determine whether the person is fit to drive, or a level or score of driving fitness, when the person enters the vehicle and before driving is started, or while the person is driving, for instance. in some embodiments, the vehicle will not allow the driver to drive if their fitness is determined insufficient, such as a fitness score or level that meets an impaired preset threshold. In situations in which a user device, such as a phone or smartwatch, acts as a vehicle entry device, the device can include a present fitness determination, whether determined at the phone, and communicate the fitness to the vehicle or not be effective in unlocking the vehicle or in causing the vehicle to be able to start.

In various embodiments, the system makes determinations regarding fitness to drive prior to the driver entering the vehicle. The activity group module making the determinations in this case can be operating from the vehicle, from a driver device, such as smartphone, laptop or tablet, or at a remote server such as a computer of the OnStar® system. An early detection and alert can be useful for the driver. The driver could advise a supervisor or other contact, such as a person the driver was to meet, that they will not arrive soon, and/or could take a nap or otherwise rest before going to their vehicle.

The system in various embodiments includes a pre-notification arrangement by which a notification is provided of any determined of non-fitness to operate the subject apparatus, whether a vehicle 10 or other apparatus, such as a bus, truck, train, plane piece of manufacturing equipment, or other. As described further below, the notification can be provided to an employer, insurance company, parent, or other designated entity, for instance. An employer could use the information to contact a replacement driver or worker for instance.

In some embodiments, the system is programmed with a driving-fitness threshold and the driver is not permitted to operate the vehicle if their current condition does not meet the threshold. The system can keep a driver from using the vehicle in various ways, such as by disallowing the vehicle to start, or from being placed in gear to drive. If the driver is already driving an autonomous-capable vehicle, the vehicle can take over driving and continue along a route, or pull over to a rest area.

Referring further to the activity group obtaining driver and other contextual data, the composite module 428, or any other action group module, in various implementations requests (pull), receives without request (push), or otherwise obtains relevant data from the database module 414. The database module 406 may include or be part of or in communication with storage portions of the vehicle 10, such as a portion storing the ancillary data mentioned. The ancillary data may, as mentioned, include one or more driver profiles. The profiles can be pre-generated by the system processor, or received from a remote source such as the remote system(s) 50, e.g., server or a remote driver computer, as examples.

The profile for each driver can include driver-specific preferences communicated to the system by the driver, such as via a touch-screen or microphone interface.

Preferences include any settings affecting a manner by which the system interacts with the driver or interacts (shares data) with a non-vehicle system such as a server or driver device. Example preferences include volume, tone, or other sound preferences for media delivery, type or volume of notifications provided to the driver, various haptic notifications, as just a few examples. Other driver preferences can include, for instance, driver preferences for how messages are provided—e.g., HUD vs. center-stack screen, and with or without audio, and if audio, a preferred type of audio.

Preferences can also be received from a remote profile, such a profile stored at a mobile or local computing device 34 or a remote server 50, and local and remote profile features can be synchronized or shared between any of the vehicle 10, the mobile or local computing devices 34, e.g., of the vehicle driver, and the remote system(s) 50, e.g., remote server.

The activity group modules in various implementations also request (pull), receives without request (push), or otherwise obtains relevant data from the database module 404. The database module 404 may include or be part of or in communication with storage portions of the vehicle 10, such as a portion storing the ancillary data mentioned. The ancillary data may, as mentioned, include one or more driver profiles. The profiles can be pre-generated by the system processor, or received from a remote source such as the remote systems 50, e.g., remote server or a remote driver computer, as examples.

The profile for each driver can include driver-specific preferences communicated to the system by the driver, such as via a touch-screen or microphone interface.

Output of the activity group 420 is in various embodiments provided to any of the output group 410, such as the database module 414 or learning module 416 thereof, and the vehicle communication sub-system 30 for reaching non-vehicle devices, such as remote computing systems.

The modules of the output group 430 format, convert, or otherwise process output of the activity group 420 as may be needed prior to delivering output or actuating an action.

As shown, example system output components include vehicle speakers, screens, various types of haptic devices, external displays (e.g., signage or specialized lighting systems that indicate vehicle status or intent) or other vehicle outputs 70.

Example system output components can also include mobile or local computing devices 34, of the driver, such as smartphones, wearables, and headphones.

Example system output components can also include remote systems 50 such as remote servers and driver computer systems (e.g., home computer). The output can be received and processed at these systems, such as to update a driver profile with a determined preference, activity taken regarding the driver, or the like.

Example system output components can also include a vehicle database. Output data can be provided to the database module 404, for instance, which can store such updates to an appropriate driver account of the ancillary data 112.

Regarding the database module 414, output can be stored and used in later learning module 416 functions and/or activity group 420 functions.

The output group 430 includes the driver-notification module 432, the vehicle-adaptation module 434, and the external communications module 436, and may include other modules coded for initiating any of the actions disclosed expressly or inherently by the present disclosure.

The driver-notification module 432 provides notifications to the driver. The notifications may be customized or adjusted based on context such as learned relationships between alerts and driver response. The system may determine for instance that the driver is more responsive, e.g., will pull over and rest, if presented with haptic and audio alerts suggesting the same.

The driver-notification module 432 can change system settings controlling a timing or manner by which the driver is alerted about vehicle operations, such as by increasing a threshold (e.g., providing forward-collision avoidance (FCA) alerts at a longer distance), an earlier timing (e.g., lane-departure warning (LDW) setting) for when the driver is alerted about leaving a lane center or approaching or crossing a lane edge, a longer-range back-up object alert notification, or any relevant driving notification.

Driver notifications can include advising the driver about ways that they can improve their fitness, such as by not starting to drive for another hour, taking a nap, pulling over at the rest station coming up in 1.5 miles, to sleep better tonight, to eat better tomorrow, etc.

The vehicle-adaptation module 434 determines one or more vehicle operations to change, such as transferring driving responsibility to the autonomous driving system.

Vehicle control can include providing driver assistance, such as by providing assistive braking early by a determined amount (e.g., 300 ms) corresponding to a determined driver level of impairment (e.g., drowsiness).

In various embodiments, via the vehicle-adaptation module 434 the system adjusts non-dynamic vehicle systems, such as a heating, ventilating, and air-conditioning (HVAC) system or infotainment system, such as to perk up the driver with cooler air or higher tempo music. The non-dynamic systems can also include dialogue with the user, such as oral or other verbal interactions that raise driver alertness. The non-dynamic systems can also include impaired-driver alerts. The system can adjust any of a wide variety of notification factors, such as mode (audio, visual, and/or haptic), timing, tone, frequency, tempo, volume, brightness, pattern of haptic feedback, or other output style, by which notifications are provided to the driver.

The system can also adjust navigation settings, such as an amount of advance notice provided to the driver about an upcoming needed maneuver such as a turn.

The external communications module 436 determines communications to provide to systems external to the vehicle 10, such as to a computer or a customer service center such as the OnStar® center. The communications can as mentioned be addressed to a supervisor, parent, or authorities, as just a few examples.

VII. ADDITIONAL STRUCTURE, ALGORITHM FEATURES, AND OPERATIONS

In combination with any of the other embodiments described herein, or instead of any embodiments, the present technology can include any structure or perform any functions as follows:

i. In various embodiments, systems according to the present technology combine historical and current driver health information, to determine a driver fitness to drive prior to or during driving, and informs the driver of the determination result.

ii. In various embodiments, systems according to the present technology combine historical and current driver health information, to determine a driver fitness to drive prior to or during driving, and can adapt safety and navigation system settings, such as adjusting a timing or manner by which alerts or navigation communications (e.g., "turn right in one-half mile" instead of "turn right in one-quarter mile") are provided.

iii. In various embodiments, systems according to the present technology combine historical and current driver health information, to determine a driver fitness to drive prior to or during driving, and can adapt timing by which an autonomous vehicle suggests, requests, or requires autonomous takeover if the driver is already driving. The timing can depend, for instance, on settings, which may coincide with parental or supervisor preferences, for instance, or on a level of fitness/impairment that the driver is determined to have.

iv. Smart wearable devices such as smart watches, or remote sensing devices (e.g., sensors embedded in a mattress) can be used to track precisely driver activities while in the vehicle and when outside of the vehicle, such as daily activity and sleep patterns and quality.

v. Information collected or generated by the system can be used to more accurately predict driver fatigue, drowsiness, or anxiety that may adversely affect driving, at the start of and/or during driving.

vi. Used vehicle sensors can include a driver-facing camera detecting driver characteristics indicative of drowsiness, fatigue, or anxiety, such as facial expressions, head nods, or eye blinking or closing. This information can be used by the system to supplement other information, such as historic or learned data, and context data, to determine present driving fitness.

vii. Drowsiness, anxiety, and fatigue can affect various drivers in substantially different manners. The historic and learning functions of the present technology enable fitness-to-drive determinations customized for the driver, thereby increasing accuracy of determinations and avoiding false alerts. The customized system thus also avoids low consumer (driver) morale and interest/usage of the system which may otherwise develop if the system was inaccurate.

viii. In various embodiments, the system is configured to communicate to the driver and/or another entity or system a determined estimated driver fitness to drive, prior to vehicle start or after.

ix. By providing conspicuous notifications to the driver about fitness, or to another entity such as a party, the technology increases the likelihood the driver acts responsibly in driving decisions and future health decisions (e.g., getting more sleep).

x. During a trip, safety alert timing (e.g., notification of apparent drowsiness detected or other crash situations), navigation maneuver timing (e.g., notification of a planned upcoming turn), and automated driving takeover requests/requirement timing, can be modified by the system based on various factors, such as present driver state information, historic driver information, and learned information.

xi. Alert modalities and intensities can be adapted based on estimated driver state—e.g., include additional alert modalities, such as by adding haptic feedback, for more drowsy drivers or increasing alert intensity of existing modality for them.

xii. In embodiments, the system can store fitness data, and provide it as needed, such as to authorities or insurance companies after an accident, assess insurance rates, as part of a driver licensing program. The data can in such instances be stored or shared automatically, such as by an actual or effective vehicle black box or data recorder.

xiii. The system or features thereof can be mandated, such as by an employer, fleet operator, parent, operator licensing entity, or federal law for instance.

xiv. The system can learn and adapt to driver behavior over time. The system can, for instance, set or adjust drowsy driver ratings for a driver, timing or type of safety alert (e.g., drowsiness alert), navigation/maneuver timing and mode (e.g., adding haptic or visual alerts for less-fit drivers), and timing of automated driving requests, suggestions or requirements. Such variables can be modified in real-time or generally continuously for a given driver and updated based on the relationships between a large quantity of health (e.g., the length/quality of recent sleep) and driver performance data gathered from previous trips stored either by the vehicle or via a portable device, such as a driver phone or smartwatch.

xv. In various embodiments, the system, whether implemented at the vehicle and/or at one or more other devices, can predict driver impairment, such as by determining that a driver is impaired based on sleep quality data, even before the driver is attempting to drive. Advance notification can be provided to interested and pre-identified parties, such as a parent, adult grandchild, employer, insurance company, fleet operator, or other.

xvi. Change in driver reaction time can be represented generically by $$R_h = f_2(H_r),$$

where $R_h$ is the change in driver reaction time, as a function of $H_r$, the driver's heart rate.

xvii. By detecting driver drowsiness using heart rate, the system can issue an alert to the driver, which decision can be presented generically by:

$$A_d = f_6(H_r),$$

where $A_d$ is the decision to issue an alert to the driver as function of $H_r$, the driver's heart rate.

xviii. Fatigue can be predicted based on any of a variety of relevant factors affecting driver energy and attention level, such as duration on road, or time since last good break from driving.

xix. Change in driver reaction time can represented as:

$$R_f = f_3(D_t, B_t) + f_3'(D_t, B_t),$$

where $R_f$ is the change in driver reaction time, as a function of $D_t$ the duration on road and $B_t$ the time since last break, and $F_3'$ is the function that uses vehicle sensors to calculate driver reaction time.

xx. Stress or anxiety can also affect driver reaction time as referenced above. Corresponding change in driver reaction time can represented as:

$$R_a = F_4(H_r),$$

where $R_a$ is the change in driver reaction time, as a function of $H_r$, the driver's heart rate.

xxi. Depending on the factors affecting reaction time analyzed (e.g., drowsiness, fatigue, anxiety), composite, resulting driver reaction time can be represented as:

$$R_t = \min(R_n + F_5(R_s, R_h, R_f, R_a), R_{max}),$$

where $R_t$ is a calculated driver reaction time, $R_n$ is a normal or baseline reaction time (e.g., 2.3 seconds), and change reaction time is a function $f_5$, of the previous calculated change in reaction times and $R_{max}$ (e.g., 3 seconds) is the maximum driver reaction time.

xxii. As an example:

$$f_3(R_a, R_h, R_f, R_a) = K_s*R_s + K_h*R_h + K_f*R_f + K_a*R_a,$$

where $K_x$, $K_h$, $K_f$, $K_a$ are the configurable coefficients for $R_s$, $R_h$, $R_f$, $R_a$ respectively.

xxiii. As provided, various vehicle parameters can be adjusted based on driver state, which can be based on historic data, learned data, and other context data. A controlling factor can be determined driver reaction time, or lowering of reaction time, which can correspond to a fitness level or rating determined. Example parameters mentioned include FCA (forward-collision avoidance) setting(s), LDW (lane-departure warning) setting(s), and alert settings (e.g., haptic, audio, visual):

1. FCA example:
   a. FCA related time-to-collision (TTC) factor is adjusted by the system based on driver state (present health), history, learned data, etc.) to give the driver more warning of potential collision, accommodating a perceived lowered reaction time. The adjustment can change a default setting, such as by moving a default setting of 3 ("far" TTC) to a level of 4 (e.g., "extra far" TTC), corresponding to more clearly impaired. Or a change, or 'delta' can be added or provided as a multiplier to an existing setting to give the driver more time corresponding to a level of perceived impairment. The vehicle can be configured so that, if the driver is determined impaired, a higher setting (more lead time) is selected with or possibly without driver discretion.
2. LDW example:
   a. A LDW related factor such as a threshold amount of distance to lane or road edge, or time to lane- or road-edge crossing, is adjusted by the system based on driver state (present health, history, learned data, etc.) to give driver more warning of potential unwanted lane drift, accommodating a perceived lowered driver reaction time. The adjustment can change a default setting, such as by moving a default setting to an earlier warning distance/timing setting if very impaired. Some vehicles are already configured to allow a driver to control such settings. The vehicle can be configured so that, if the driver is determined impaired, a higher setting (more lead time) is selected with or without driver discretion.
   b. The LDW setting can be presented by.

$$LW_c = \max(LW_o*(1-\Delta R_t), K\_LW_{min})$$

where is the lane width calculated as a function of observed lane width and driver reaction time, $LW_o$ is the observed lane width, $\Delta R_t$ is the percentage increase in driver reaction from normal value, and $LW_{min}$ is the minimum lane width
3. Alert mode example (audio/haptic/visual, etc.)
   a. An audio alert setting can be presented generally by:

$$A_c = \min(A_n*(1+\Delta R_t), A_{min})$$

where $A_n$ is the normal audio intensity (e.g., 75 dBA), $A_{max}$ is the maximum audio intensity (e.g., 80 dBA) and $\Delta R_t$ is the percentage increase in driver reaction from normal value, and $A_c$ is the computed Audio intensity
   b. Similar computation can be used for make adaptive haptic intensity or type otherwise, or visual notification intensity or type otherwise.

xxiv. Vehicle or driver device systems than can be adjusted by the system based on driver state (present health), learned data, etc., in various embodiments include and are not limited to:

1. Adapting an FCA setting, such as a calibration constant or setting affecting headway;
2. Adapt an LDW setting,
3. Adapt settings for Side Blind Zone Alert, Lane Change Alert, Front and Rear Park Assist, Rear Cross Traffic, Lane Keep Assist, Stop Sign/Red Light Warning, Front Cross Traffic Warning, Head-On Collision, and various V2V and V2I alert and notification systems;
4. Adapting timing or other manner (e.g., more conspicuously) by which navigation information (e.g., right turn coming up") is provided to the driver;
5. Adapting automated vehicle takeover timing, such as timing of requests, suggestions or required takeovers;
6. Adapting type of any alert, such as volume or other intensity, modalities used, and pattern used such as alerts to advise the driver of their impairment or about driving conditions (e.g., FCA, LDW, etc.);
7. Suppressing vehicle notifications that might overload driving task, such as by rejecting, disabling, masking, or otherwise not advising the driver of incoming calls, texts, etc.
8. Disabling vehicle functions that might interfere with driving task, such as HMI usage, phone projection to vehicle center-stack screen or HUD, for instance, or other non-essential functions that may distract the user from focusing on driving in their lowered fitness state.
9. Instituting active countermeasures, such as cooling the cabin via vehicle HVAC system, or increasing volume and music selection via vehicle infotainment system.
10. Adjusting settings related to a teen-driver, or other special driver (e.g., driver on probation), arrangement, such as settings of the Teen Driver or Teen Driving system debuted on the 2016 Chevrolet Malibu vehicle.
11. Providing suggestions to the driver regarding ways to rest, such as an upcoming rest area or stop for fuel and rest, or food and rest.

xxv. In various embodiments, the system could be configured to use reaction to stimuli as a metric about fitness to drive. The driver could be prompted while stationary to perform reaction time and decision-making tasks, or the vehicle can determine how the driver is responded to real-time stimuli in connection with vehicle operation, to see if the user responds to alerts or makes required adjustments (e.g., steering adjustments) in a timely manner. The test could be provided in connection with a first drive of the day, in the morning, for instance. The test could ask for driver input about hours of sleep in absence of sensors like a smart watch with such data. As an example learning function of the vehicle in connection with such tests, the vehicle may determine from the results that while HR and quality of sleep metrics are poor for a subject driver, the driver is still responsive, and so the system can determine that the driver is more immune to lack of sleep than the average person, and adjust system or vehicle operations accordingly (e.g., timing of warning, content or provision at all of notifications, etc.).

VIII. SELECT ADVANTAGES

Many of the benefits and advantages of the present technology are described above. The present section restates some of those and references some others. The benefits described are not exhaustive of the benefits of the present technology.

The present technology can determine accurately whether a driver is impaired for driving, such as due to drowsiness, fatigue, or stress in embodiments such as those using historic driver data and/or learning functions.

Third parties, or entities other than the driver can benefit, such as by an insurance company being able to determine that a driver is not driving impaired. The insurance company may provide a discount to the driver based on the amount of fitness data they allow to be shared with the insurance company. In addition, commercial fleet operators may use this data to provide extra compensation for drivers who show a pattern of consistently observed as fit to drive. Other interested parties include parents, adult grandparents, supervisors, etc.

The system can be used by and specially configured for target groups of individuals, such as those having sleep disorders.

Operation of apparatus, such as vehicles, construction equipment, or other heavy equipment is made safer by the present technology.

IX. CONCLUSION

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Directional references are provided herein mostly for ease of description and for simplified description of the example drawings, and the systems described can be implemented in any of a wide variety of orientations.

References herein indicating direction are not made in limiting senses. For example, references to upper, lower, top, bottom, or lateral, are not provided to limit the manner in which the technology of the present disclosure can be implemented. While an upper surface may be referenced, for example, the referenced surface can, but need not be, vertically upward, or atop, in a design, manufacturing, or operating reference frame. The surface can in various embodiments be aside or below other components of the system instead, for instance.

Any component described or shown in the figures as a single item can be replaced by multiple such items configured to perform the functions of the single item described. Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed is:

1. A non-transitory computer-readable storage device comprising:
    an input interface module that, when executed by a tangible, hardware-based processing unit, receives:
        sensed driver-health data indicating a present driver health factor of a vehicle driver;
        past driver-health-factor data indicating a past driver health factor; and
        past driver-driving-performance data indicating past driver-driving performance including a manner by which the driver made driving actions in driving a vehicle in the past;
    a learning module that, when executed by the tangible, hardware-based processing unit, generates learned vehicle-driver-driving data based on the past driver-health-factor data and the past driver-driving-performance data, wherein the past driver-driving performance corresponds in time to a measurement of the past driver health factor, and stores the learned vehicle-driver-driving data via a database module as part of driver-profile data; and
    an activity module that, when executed by the tangible, hardware-based processing unit, determines, based on the sensed driver-health data and the learned vehicle-driver-driving data, fitness of the driver to drive the vehicle, yielding a fitness determination.

2. The non-transitory computer-readable storage device of claim 1, wherein the activity module, when executed by the tangible, hardware-based processing unit, determines, based on the fitness determination, a manner by which to adjust presentation timing of a navigation notification to be provided to the driver via a hardware interface.

3. The non-transitory computer-readable storage device of claim 2 wherein the activity module, when executed, by the tangible, hardware-based processing unit, determines, based on the fitness determination, and along with the manner by which to adjust presentation timing of the navigation notification to be provided to the driver via a hardware interface, content for the navigation notification.

4. The non-transitory computer-readable storage device of claim 2 wherein the navigation notification is a navigation instruction.

5. The non-transitory computer-readable storage device of claim 2 wherein the adjustment to presentation timing provides a greater amount of advance notice to the driver regarding an upcoming needed maneuver than an amount of advance notice that would be provided without the adjustment.

6. The non-transitory computer-readable storage device of claim 1, wherein:
    said fitness determination is an in-driving fitness determination;
    the input interface module, when executed by the tangible, hardware-based processing unit, receives, prior to the driver operating a vehicle, while the driver is not operating a vehicle, non-driving driver-health data indicating a non-driving health factor pertaining to the driver; and
    the activity module, when executed by the tangible, hardware-based processing unit:
        obtains the non-driving driver-health data; and
        determines, based on the non-driving driver-health data, fitness of the driver to operate the vehicle, yielding a pre-driving fitness determination.

7. The non-transitory computer-readable storage device of claim 6, wherein the activity module, when executed by the tangible, hardware-based processing unit, determines, based on the pre-driving fitness determination, whether to allow the potential driver to operate the vehicle.

8. The non-transitory computer-readable storage device of claim 6, wherein the non-driving driver-health data indicates an amount or quality of sleep for the driver, and the amount or quality is less than a preferred amount or quality of sleep.

9. The non-transitory computer-readable storage device of claim 6, wherein the activity module, when executed by the tangible, hardware-based processing unit:
 obtains non-driving other-person-health data indicating a non-driving other-person health factor of a person other than the driver; and
 determines the fitness of the driver to operate the vehicle, yielding the pre-driving fitness determination, based on the non-driving driver-health data and the non-driving other-person-health data.

10. A non-transitory computer-readable storage device comprising:
 an input interface module that, when executed by a tangible, hardware-based processing unit, receives sensed driver-health data indicating a present driver health factor of a vehicle driver; and
 an activity module that, when executed by the tangible, hardware-based processing unit:
  obtains the sensed driver-health data;
  determines, based on the present human-driver health factor, fitness of the driver to operate a vehicle, yielding a fitness determination; and
  determines, based on the fitness determination, a manner by which to adjust presentation timing of a navigation notification to be provided to the driver via a local hardware interface.

11. The non-transitory computer-readable storage device of claim 10, wherein:
 said fitness determination is an in-driving fitness determination;
 the input interface module, when executed by a tangible, hardware-based processing unit, receives non-driving driver-health data indicating a non-driving health factor pertaining to a driver, wherein the input interface module receives the non-driving driver-health data while the driver is not operating a vehicle and before the driver is operating a vehicle; and
 the activity module, when executed by the tangible, hardware-based processing unit:
  obtains the non-driving driver-health data; and
  determines, based on the non-driving driver-health data, fitness of the driver to operate the vehicle, yielding a pre-driving fitness determination.

12. The non-transitory computer-readable storage device of claim 11, wherein the activity module, when executed, determines, based on the pre-driving fitness determination, whether to allow the driver to operate the vehicle.

13. The non-transitory computer-readable storage device of claim 11, wherein the activity module, when executed by the tangible, hardware-based processing unit:
 obtains non-driving other-person-health data indicating a non-driving other-person health factor of a person other than the driver; and
 determines the fitness of the driver to operate the vehicle, yielding the pre-driving fitness determination, based on the non-driving driver-health data and the non-driving other-person-health data.

14. The non-transitory computer-readable storage device of claim 10 wherein the activity module, when executed by the tangible, hardware-based processing unit, determines, based on the fitness determination, and along with the manner by which to adjust presentation timing of the navigation notification to be provided to the driver via a hardware interface, content for the navigation notification.

15. The non-transitory computer-readable storage device of claim 10 wherein the navigation notification is a navigation instruction.

16. The non-transitory computer-readable storage device of claim 10 wherein the adjustment to presentation timing provides a greater amount of advance notice to the driver regarding an upcoming needed maneuver than an amount of advance notice without the adjustment.

17. A non-transitory computer-readable storage device comprising:
 an input interface module that, when executed by a tangible, hardware-based processing unit, receives non-vehicle-driving driver-health data indicating a non-vehicle-driving health factor pertaining to a potential driver, wherein the input interface module receives the non-vehicle-driving driver-health data while the potential driver is not operating a vehicle and before the potential driver is operating a vehicle; and
 an activity module that, when executed by the tangible, hardware-based processing unit:
  obtains the non-driving driver-health data;
  obtains non-driving other-person-health data indicating a non-driving other-person health factor of a person other than the potential driver; and
  determines a fitness of the potential driver to operate the vehicle, based on the non-vehicle-driving driver-health data and the non-driving other-person-health data, yielding a pre-driving fitness determination.

18. The non-transitory computer-readable storage device of claim 17, wherein the activity module, when executed by the tangible, hardware-based processing unit, determines, based on the pre-driving fitness determination, whether to allow the potential driver to operate the vehicle.

19. The non-transitory computer-readable storage device of claim 17, wherein the non-driving driver-health data indicates an amount or quality of sleep for the potential driver, and the amount or quality is less than a preferred amount or quality of sleep.

* * * * *